No. 751,365. PATENTED FEB. 2, 1904.
F. C. WOODS.
FISH HOOK.
APPLICATION FILED AUG. 22, 1903.
NO MODEL.
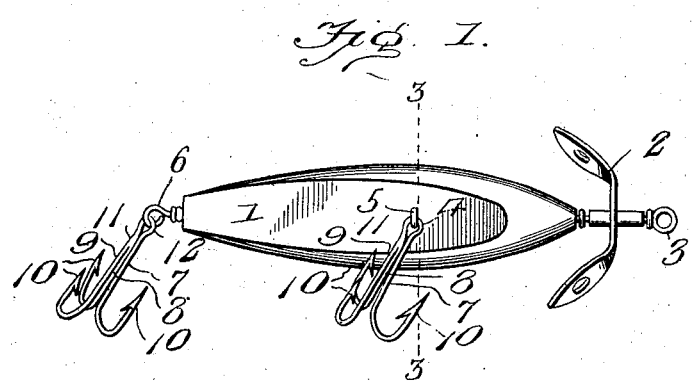
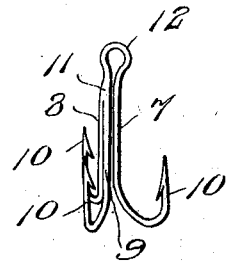
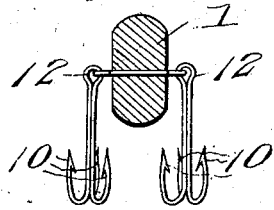
Witnesses
Inventor
Franklin C. Woods,
By Victor J. Evans
Attorney No. 751,365. Patented February 2, 1904.

UNITED STATES PATENT OFFICE.

FRANKLIN C. WOODS, OF ALLIANCE, OHIO.

FISH-HOOK.

SPECIFICATION forming part of Letters Patent No. 751,365, dated February 2, 1904.

Application filed August 22, 1903. Serial No. 170,451. (No model.)

*To all whom it may concern:*

Be it known that I, FRANKLIN C. WOODS, a citizen of the United States, residing at Alliance, in the county of Stark and State of Ohio, have invented new and useful Improvements in Fish-Hooks, of which the following is a specification.

This invention relates to a detachable treble hook for use in piscatorial pursuits and particularly adapted for use in connection with artificial bait employed in casting and trolling, but capable also of attachment to other devices or lines embodying artificial alluring means.

The primary object of the invention is to provide a detachable treble hook capable of application without the use of tools and having a sufficient resiliency to overcome the tendency or liability of breakage when struck by a fish or when landing a fish after the latter is hooked.

A further object of the invention is to simplify the construction of this class of devices and render them exceptionally convenient in application.

With these and other objects and advantages in view the invention consists in the construction and arrangement of the several parts, which will be more fully hereinafter described and claimed.

In the drawings, Figure 1 is a side elevation of an artificial bait or minnow, showing the improved hook applied thereto. Fig. 2 is a detail view of the improved hook. Fig. 3 is a cross-sectional view on the line 3 3 of Fig. 1.

Similar numerals of reference are employed to indicate corresponding parts in the several views.

The numeral 1 designates an artificial bait or minnow, preferably formed of wood, though other buoyant material may be used, and the exact construction of this bait is not essential to the effective application and operation of the improved hook. The bait 1, as shown, has a forward spinner 2 and a connecting means 3 for attachment to a line. Extending transversely through the bait is a rod 4 with projected terminal eyes 5 at opposite sides of the bait, as clearly shown by Fig. 3. At the rear of the bait is an eye 6. The bait, as set forth, illustrates one practical support or means of carrying the improved hook, which will now be described in detail.

The hook is of the treble class and embodies shanks 7, 8, and 9, terminating at their lower extremities in vertical hooks 10. The shanks 8 and 9 are closely assembled and at their upper extremities merge into a single strand 11. The shank 7 is free or unattached relatively to the shanks 8 and 9 and is normally spaced apart from the latter, as clearly indicated by Fig. 2, and continues upwardly into an attaching-eye 12, which merges into the single strand 11, forming part of the shanks 8 and 9.

It will be understood that the treble hook will be formed of metal usually employed for such purposes, and the shank 7 is resilient, so that it can spring outward from and inwardly toward the shanks 8 and 9.

In applying the improved form of treble hook set forth either to the eyes 5 and 6 or to other analogous devices forming the parts of an artificial bait the hook of the shank 7 is inserted through the eye and the shank 7 forced therethrough, the eye being then between said shank 7 and the shanks 8 and 9. Pressure on the treble hook is continued until the eye 12 is in engagement with the eye of the bait to which it is desired to attach the hook, and the shank 7 then springs back into normal position and obstructs accidental disengagement of the hook from the eye. In removing or detaching the treble hook a reverse operation is pursued, and it will be understood that hooks of various sizes embodying the features of the invention may be attached to the same artificial bait with very little trouble and material advantages. The hook, especially that embodying the shank 7, being of resilient material will resist breakage when a strike is made or in landing a fish after hooking the latter. Another advantage is that one set of hooks can be used with different forms of artificial bait and always have present the treble form of hook.

Having thus fully described the invention, what is claimed as new is—

1. A detachable treble hook having two hooked shanks continuing at their upper portions into an eye, and a third shank with a lower hooked extremity secured to one of the said two hooked shanks to permit one of the latter to have free movement in relation to the shanks of the remaining hooks for application of the entire hook structure to an attaching or supporting means.

2. A detachable treble hook having one hooked shank free to move outwardly and inwardly toward the remaining shanks, two of the latter continuing into a single attaching-eye at their upper extremities and one of the same carrying the third hook.

3. The combination with a support having closed eyes projected therefrom, of a detachable treble hook movably engaging said eyes and having two of the shanks thereof continuously formed with an upper attaching-eye and a third shank secured to, and carried by, one of the said two shanks.

In testimony whereof I affix my signature in presence of two witnesses.

FRANKLIN C. WOODS.

Witnesses:
H. W. GREEN,
C. C. SHAFFER.